(12) United States Patent
Greppi

(10) Patent No.: US 9,168,943 B2
(45) Date of Patent: Oct. 27, 2015

(54) STEERING DEVICE

(75) Inventor: Bruno Greppi, Erba (IT)

(73) Assignee: Nardi-Personal Spa, Abbiate Guazone (IT)

( * ) Notice: Subject to any disclaimer, the term of this patent is extended or adjusted under 35 U.S.C. 154(b) by 660 days.

(21) Appl. No.: 12/089,583

(22) PCT Filed: Oct. 12, 2005

(86) PCT No.: PCT/IT2005/000597
§ 371 (c)(1),
(2), (4) Date: Apr. 8, 2008

(87) PCT Pub. No.: WO2007/043072
PCT Pub. Date: Apr. 19, 2007

(65) Prior Publication Data
US 2008/0257103 A1  Oct. 23, 2008

(51) Int. Cl.
*B62D 1/04* (2006.01)
*B62D 1/06* (2006.01)

(52) U.S. Cl.
CPC .. *B62D 1/06* (2013.01); *B62D 1/04* (2013.01); *Y10T 74/20864* (2015.01)

(58) Field of Classification Search
CPC ............... Y10T 74/20834; Y10T 74/2084; Y10T 74/20846; Y10T 74/20864; Y10T 74/20792; Y10T 74/20798; Y10T 74/20804; Y10T 74/2081; Y10T 74/20816; B62D 1/04; B62D 1/06; B62D 1/043
USPC ............. 74/552, 557, 553–556, 551.1–551.7, 74/543; D12/175, 177
See application file for complete search history.

(56) References Cited

U.S. PATENT DOCUMENTS

| | | | | |
|---|---|---|---|---|
| 231,609 A | * | 8/1880 | Perkins | 74/551.1 |
| 566,068 A | * | 8/1896 | Erb | 74/551.5 |
| 570,560 A | * | 11/1896 | McQuown | 74/551.4 |
| 578,180 A | * | 3/1897 | Wood | 74/543 |
| 586,307 A | * | 7/1897 | Dickson | 74/551.4 |
| 601,613 A | * | 3/1898 | Castle | 74/551.4 |
| 601,792 A | * | 4/1898 | Gardner et al. | 74/551.4 |
| 613,673 A | * | 11/1898 | Frederick | 74/551.4 |
| 641,118 A | * | 1/1900 | Kelly | 74/551.4 |
| 1,448,332 A | * | 3/1923 | Caralun | 74/544 |
| 1,714,155 A | | 5/1929 | Binkley | |

(Continued)

FOREIGN PATENT DOCUMENTS

| | | |
|---|---|---|
| JP | 62122865 | 6/1987 |
| JP | 11342849 | 12/1999 |
| JP | 2004 175217 | 6/2004 |

OTHER PUBLICATIONS

JP,11-342849,A(1999)]. Japan Patent Office. http://dossier1.ipdl.inpit.go.jp/AIPN/odse_call_transl.ipdl?N0000=7413&N0005=Ei7BzenZVnBvfz7D1ZIK&N0120=01&N2001=2&N3001=h11-342849&Ntt3=autoV14&Ntt4=logisticsV14&Ntt5=machineV14&Ntt6=&Ntt7=&Ntt8=&Ntt9=&Ntt10=&Ntt11=&Ntt12=.*

*Primary Examiner* — Daniel Yabut
(74) *Attorney, Agent, or Firm* — Nixon & Vanderhye, P.C.

(57) ABSTRACT

The invention discloses a steering device comprising a support structure having a central hole and at least two handgrips, at least one of these being mobile, placed in distal positions compared to the central hole and tied to the support structure by means of pivots. The mobile handgrip is rotatable around an axis substantially orthogonal to the plane of the support structure, so as to manually apply thereto a rotating motion around the axis of the column.

17 Claims, 8 Drawing Sheets

(56) References Cited

U.S. PATENT DOCUMENTS

| | | | | |
|---|---|---|---|---|
| 1,866,111 | A | * | 7/1932 | Jones .............................. 74/557 |
| 2,507,600 | A | * | 5/1950 | Kaiser et al. ..................... 74/494 |
| 2,737,060 | A | | 3/1956 | Wright |
| 3,176,537 | A | | 4/1965 | Zeigler |
| 3,196,709 | A | * | 7/1965 | Bickford ......................... 74/557 |
| 3,282,124 | A | * | 11/1966 | Peterson ......................... 74/552 |
| 3,312,123 | A | | 4/1967 | Rumpf |
| 3,941,009 | A | * | 3/1976 | Brown ............................ 74/543 |
| 4,624,470 | A | * | 11/1986 | Love ............................ 74/551.3 |
| 5,133,224 | A | * | 7/1992 | Prins ............................ 74/551.3 |
| 6,343,526 | B2 | * | 2/2002 | Reicks et al. ................... 74/557 |

\* cited by examiner

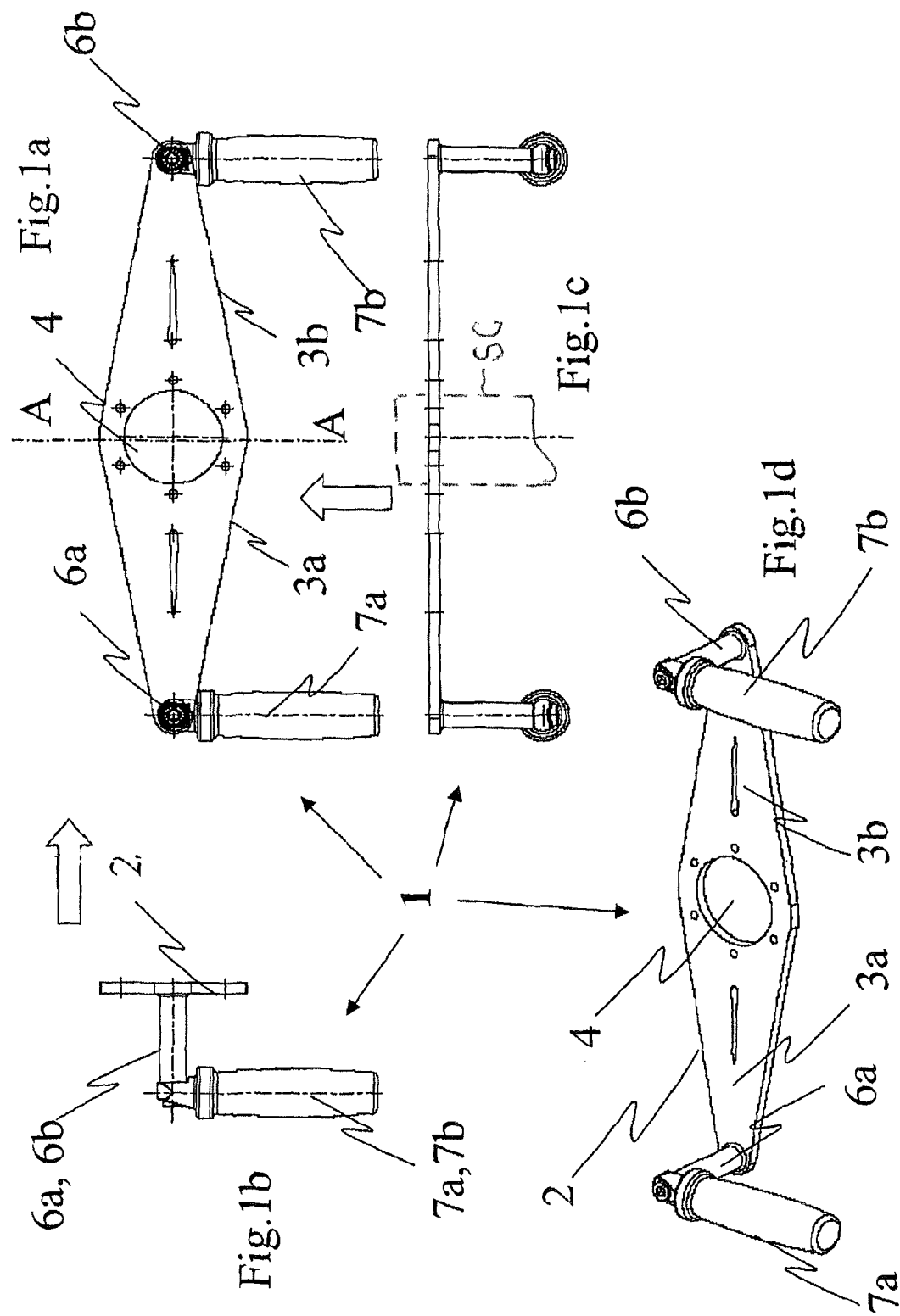

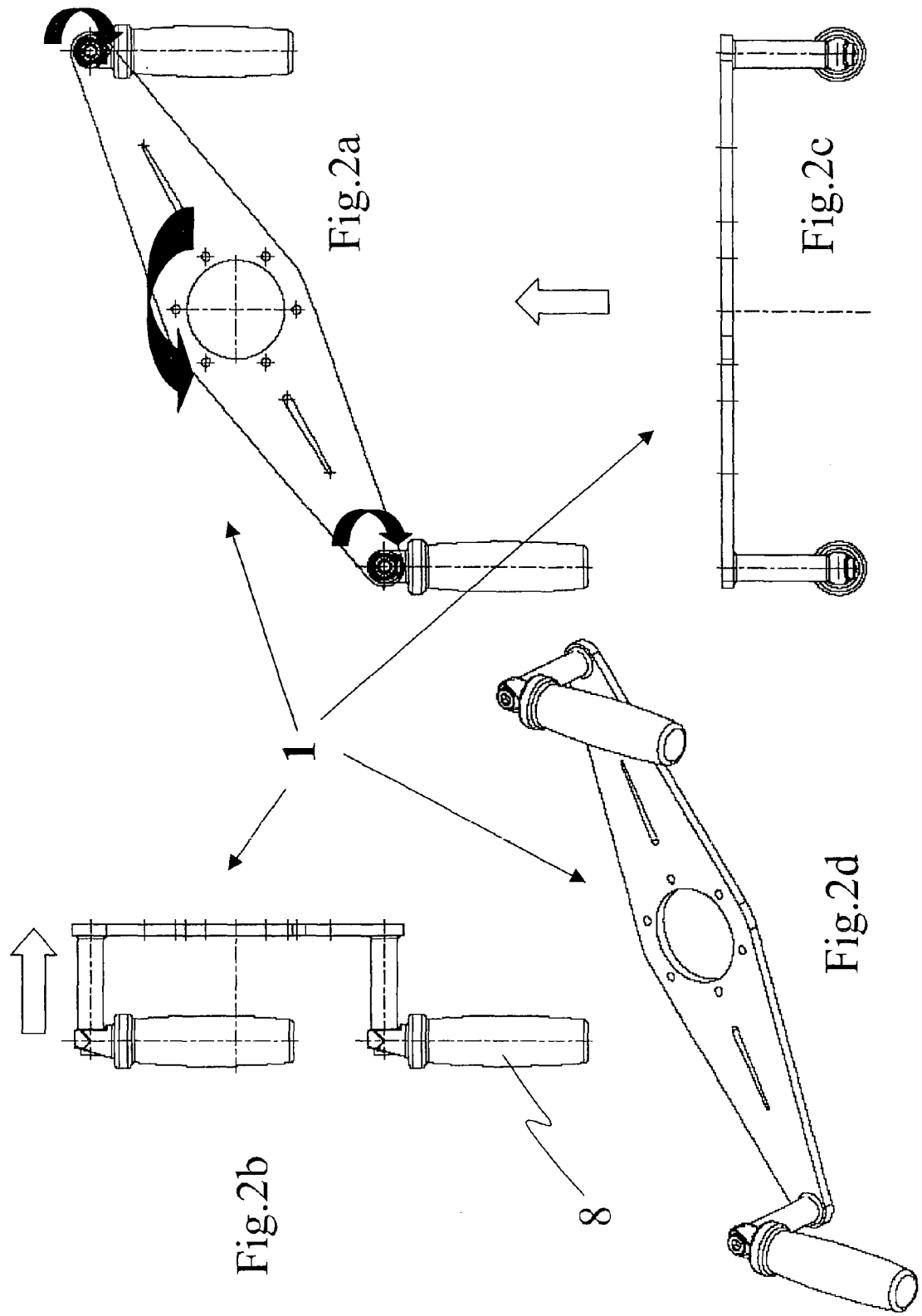

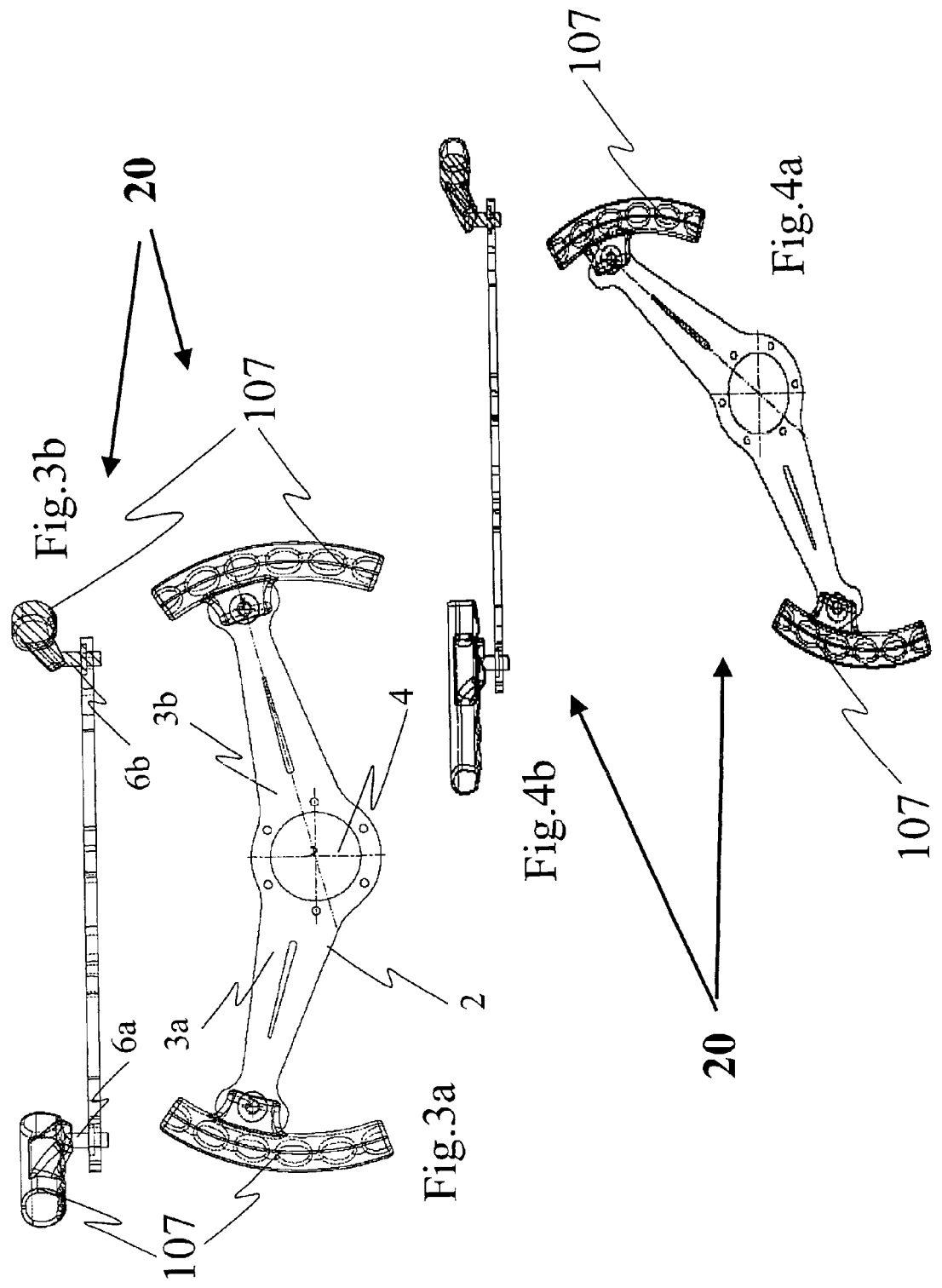

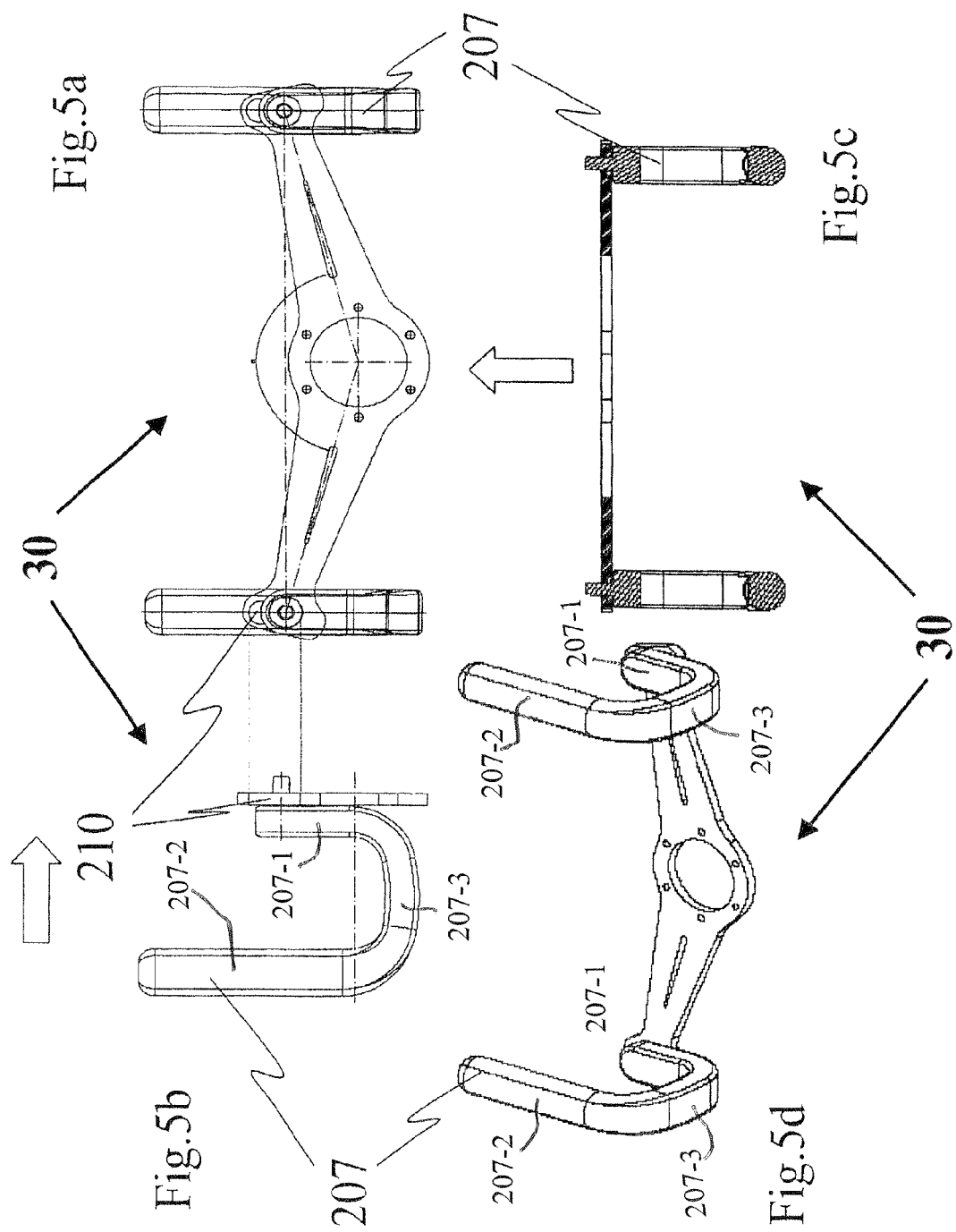

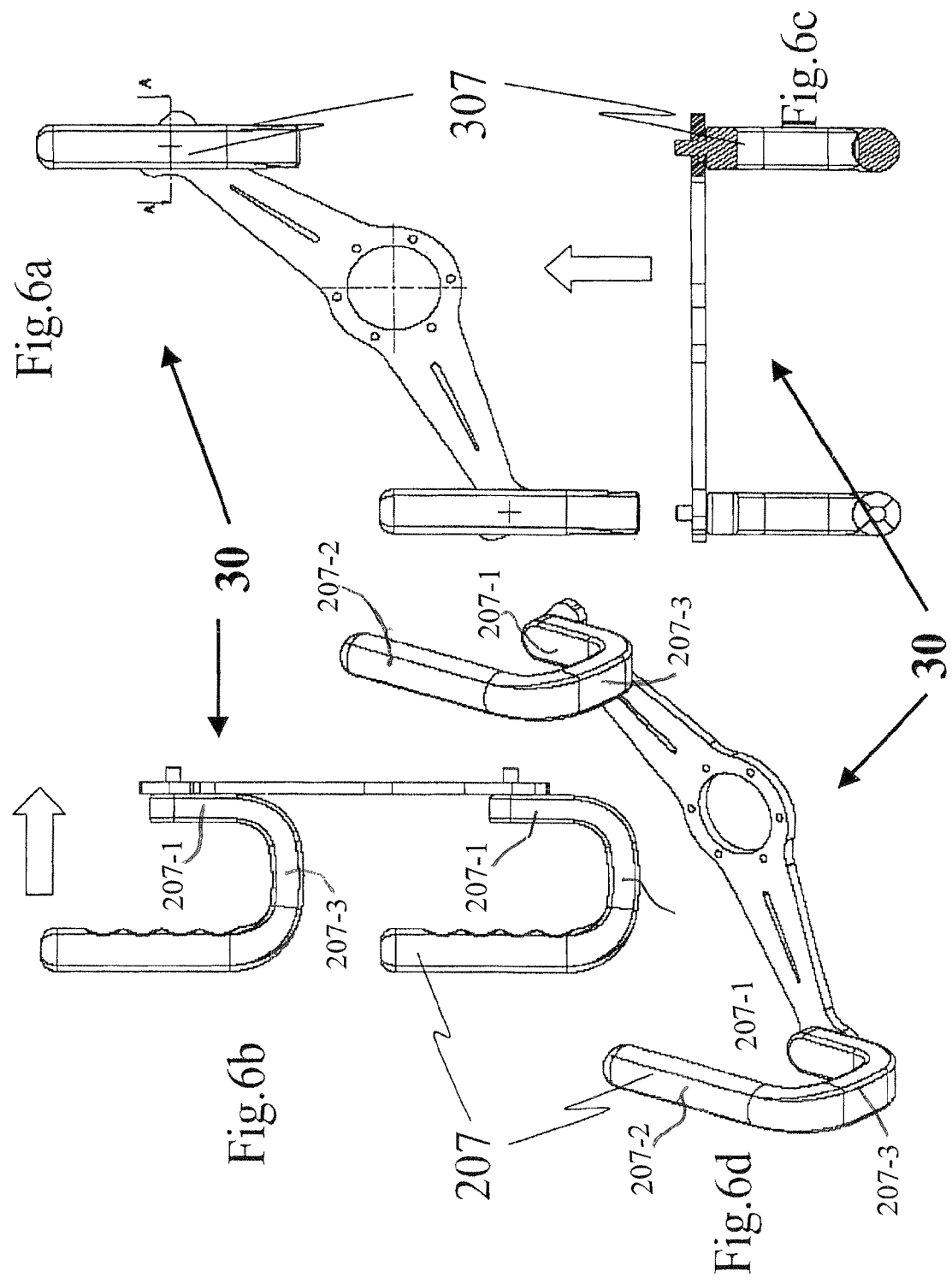

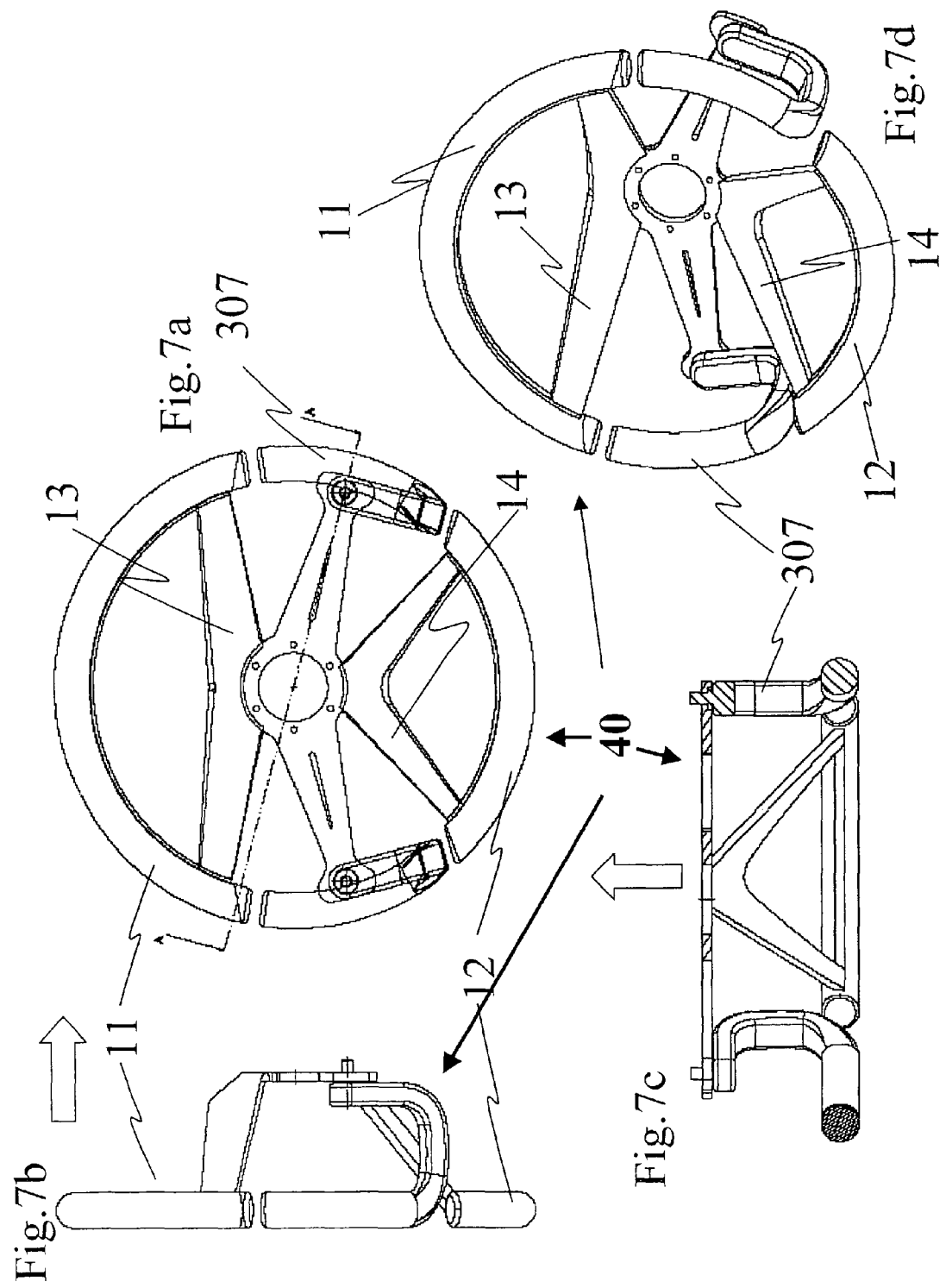

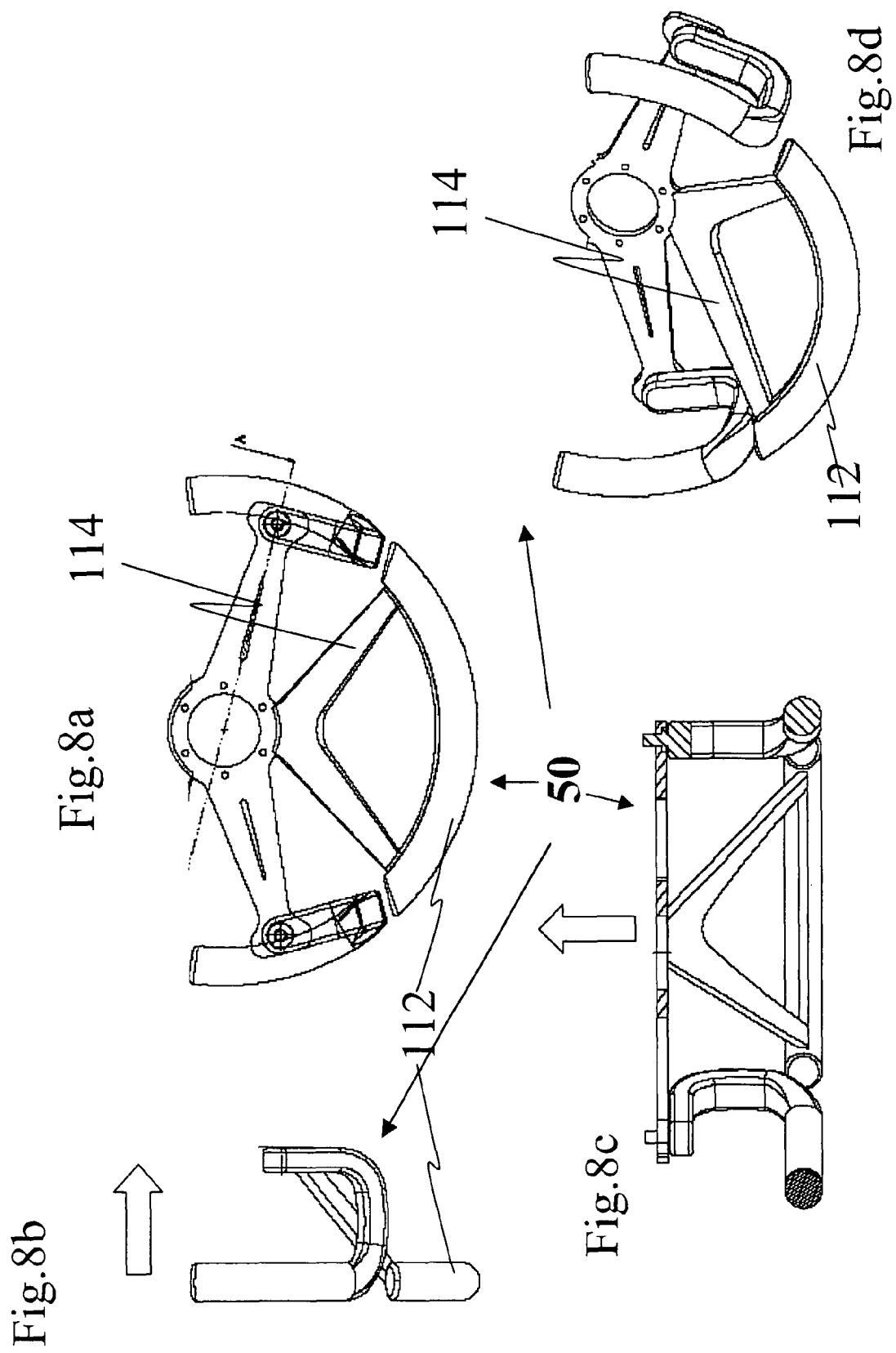

STEERING DEVICE

BACKGROUND

This application is the U.S. national phase of International Application No. PCT/IT2005/000597 filed Oct. 12, 2005, the disclosure of which is incorporated herein by reference in its entirety. The International Application was published in English on Apr. 19, 2007 as WO 2007/043072A1 under PCT Article 21(2).

The technology disclosed herein discloses a steering device particularly usable, but not exclusively, for motor vehicles and the following description has been made referring to this field of application only with the purpose to make the description easier.

However, the device is usable also for trolley vehicles, farm machinery, public works vehicles, motor boats, amphibious vehicles, and the like or for any vehicle allowing a movement even if not rectilinear.

As it is well known, starting from the first motor vehicles, the steering control has always been transmitted from a steering device, usually known as a "steering wheel" fixed on a central hub and connected, by means of a steering column, to steering mechanisms controlling the directioning position of the front wheels. Over the years, the steering wheels have been modified and improved in design, ergonomics, adjustment etc.

Nowadays steering wheels exist which are adjustable in height and inclination, made of different materials, stronger and, at the same time, of lighter weight, steering wheels that are able to absorb shocks, thanks to modification to the steering column, or more simply, equipped with instantaneously inflatable cushions (called airbags) to protect the driver in case of collision.

The shape of the steering wheels has changed, in some cases, as for example in "Formula One", in which steering wheels of semicircular shaped and extractable from the driver have been used, to satisfy more restrictive space needs, during the driving and upon getting in and out of the vehicle.

The way in which the steering is controlled has not changed. The steering control is applied by the driver of the vehicle to the steering wheel; safety rules and highway code require the driver to hold the steering wheel with both hands, while driving, in order to have a better control of the vehicle.

However, in particular driving conditions, for example in reverse motion, or in U-turn, it is uncomfortable to keep both hands onto the steering wheel; during reverse motion, the position of the driver is unnatural in comparison with the normal driving position, the driver being partially or totally turned backwards, thereby he tends to detach one hand from the steering wheel.

Moreover in case of elbow bends, sudden swerving, steering corrections, etc. it is also difficult to timely steer, the steering wheel having an intrinsic resistance against the rotation.

This last inconvenience is more evident under driving conditions already naturally extreme like in rallies, road races, track races or the like.

The need of avoiding frequently detaching the hands from the steering wheel, in event of bends, U-turns and reverse motion, causes the driver to accompany hands on the steering wheel, the rotation of the steering wheel as far as possible, leading to a torsion of the arms in the direction of the steering. This fact results in a continuous stress on the muscles of the arms increasing in time and in proportion to non rectilinear paths. In JP 11 342849 A to Honda Motor Co. Ltd. the arm, opposite to the direction of rotation, suffers for the same continuous stress, during a rotation of the steering wheel.

Moreover, the aforementioned stresses are a not negligible problem for drivers unskilled or poorly inclined to the driving.

Under extreme driving conditions, as rallies, road races, or track races, the crosswire acceleration acting during bends amplifies even more the stresses acting on the arms and on the shoulders making it necessary a high physical effort to drive the vehicle.

The purpose of the technology disclosed herein is to provide a steering device having structural and functional features to overcome the above described drawbacks.

A particular purpose of the technology disclosed herein is thus to guarantee greater driving safety, to reduce the effort needed for the steering control and to reduce the stress on the arms and the shoulders during the steering.

These purposes are achieved by means a steering device comprising a support structure fixed on a steering column by means of a central hub and rotatable with the steering column to operate control mechanisms for the direction of the front wheels, characterised by comprising at least two handgrips, at least one of which being mobile, connected to the support structure, said at least one mobile handgrip being rotatable around an axis substantially orthogonal to the lying and rotating plane of the support structure so as to manually impart a rotating motion, around the steering column axis, to said support structure.

According to a preferred embodiment of the technology disclosed herein, the device comprises two mobile handgrips, fastened to said support structure in symmetrical positions with respect to the mid-plane of the support structure, said handgrips being shaped for the normal grip by the two hands of the driver.

BRIEF DESCRIPTION OF THE DRAWINGS

The features and the advantages of the technology disclosed herein will be clear from the following description of an example of realization given in a indicative and non limitative way referring to the attached drawings.

FIG. 1a is a plan view from above of a basic embodiment of a steering device according to the technology disclosed herein, in a first operating position.

FIGS. 1b and 1c are side views of the device of FIG. 1a, seen according to arrows, and FIG. 1d is a partial perspective view of the device of FIG. 1a.

FIG. 2a is a plan view from above of the basic embodiment of steering device according to the technology disclosed herein, in a second operating position.

FIGS. 2b and 2c are side views of the device of FIG. 2a, seen according to arrows, and FIG. 2d is a partial perspective view of the device of FIG. 2a.

FIG. 3a is a plan view from above of the second embodiment of a steering device, according to the technology disclosed herein, in a first operating position and FIG. 3b is a side view of the device of FIG. 3a, seen according to the arrow.

FIG. 4a is a plan view from above of the second embodiment of steering device according to the technology disclosed herein, in a second operating position and FIG. 4b is a side view of the device of FIG. 4a, seen according to the arrow.

FIG. 5a is a plan view from above of a third embodiment of a steering device according to the technology disclosed herein, in a first operating position FIGS. 5b and 5c are side views of the device of FIG. 5a, seen according to arrows, and FIG. 5d is a partial perspective view of the device of FIG. 5a.

FIG. 6a is a plan view from above of the third embodiment of steering device according to the technology disclosed herein, in a second operating position.

FIGS. 6b and 6c are side views of the device of FIG. 6a, seen according to arrows, and FIG. 6d is a partial perspective view of the device of FIG. 6a.

FIG. 7a is a plan view from above of a fourth embodiment of a steering device according to the technology disclosed herein.

FIGS. 7b and 7c are side views of the device of the FIG. 7a, seen according to arrows, and FIG. 7d is a partial perspective view of the device of FIG. 7a.

FIG. 8a is a plan view from above of a fifth embodiment of a steering device according to the technology disclosed herein.

FIGS. 8b and 8c are side views of the device of FIG. 8a, seen according to arrows, and FIG. 8d is a partial perspective view of the device of FIG. 8a.

DETAILED DESCRIPTION

Figure 9:
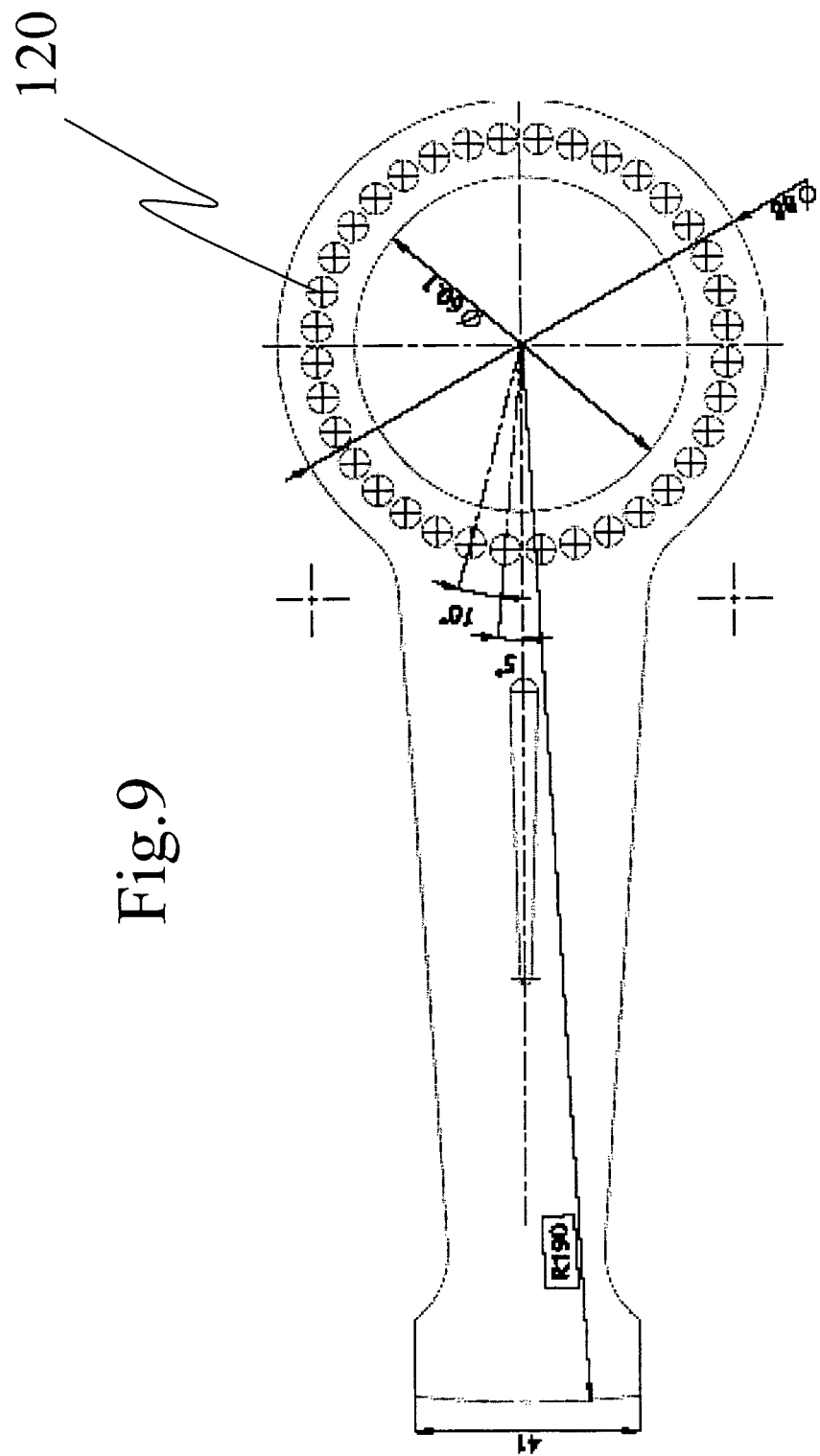
FIG. 9 is a plan view from above of a spoke usable with a steering device of the preceding figures.

In all the figures of the following description, and briefly described above, a steering device can be in a position that we define as "central", namely that allows the motion of the vehicle in a rectilinear direction, or in a position that we will define as "rotated", namely reached through a steering control.

Referring to the embodiment shown in FIGS. 1a, 1b, 1c and 1d, the steering device comprises a support structure 2 integrally built by two spokes 3a and 3b with a central hole 4, for the fastening on a steering column; all is shown in detail in FIGS. 1a, 1c and 1d. A schematic or graphical representation of an example steering column SC is shown in broken lines in FIG. 1c. Support structure 2 comprises plural peripheral holes arranged around central hole 4. In at least some embodiments, each spoke 3a and 3b reduces in width (tapers in a narrowing fashion) toward the end thereof which is distal to the central hole 4.

The central hole 4 fits the steering column, permitting the fixing of the support structure 2 to the steering column itself; the latter is responsible of the transmission of the rotation of the steering device 1 to mechanisms controlling the change of the motion direction of the vehicle, by operating on directional members, such as wheels, tracks, rudders or the like. Support structure 2 comprises plural peripheral holes arranged around central hole 4. In at least some embodiments, each spoke 3a and 3b reduces in width (tapers in a narrowing fashion) toward the end thereof which is distal to the central hole 4.

Two pivots 6a, 6b are fastened at the ends of the spokes 3a, 3b, in distal positions with respect to the central hole 4, each pivot being rotatable around an axis perpendicular to the plane of the related spoke.

A handgrip 7a, 7b is secured at the free end of each pivot, it being substantially shaped as a twist grip, lying on a plane substantially perpendicular to the axis of the respective pivot 6a, 6b and consequently substantially parallel to the plane of the support structure 2. As shown in FIG. 1a-FIG. 1d, as well as FIG. 2a-FIG. 2d, each twist grip 7a, 7b has essentially the shape of a cylinder and comprises a first end 7a-1, 7b-1 and a second end 7a-2, 7b-2, with the first end being rotatably associated to the respective pivot 6a, 6b, and the second end being a free end which linearly extends along an axis of the cylinder in a plane parallel to the lying and rotating plane of said support structure.

Advantageously, according to the technology disclosed herein, the support structure 2 and the twist grips 7 are mechanically connected by means of the pivots 6a, 6b, but are not tied to each other in their respective rotations, being able to rotate on two parallel planes respectively around the steering column and the axes of the pivots 6a, 6b, and being fixed to the support structure in symmetrical positions with respect to the mid-plane A-A.

That means that while the support structure 2 is rotated by a certain angle around the axis of the steering column, the twist grips 7, although following the rotation of the support structure 2 around the column, are also themselves rotatable around the axes of the pivots 6a, 6b, by an angle different from the angle of the rotation of the support structure 2 around the axis of the steering column, as well therewith. Moreover, the two twist grips 7, being not tied in their respective rotations around the axes of the pivots 6a, 6b, can also be rotated by angles of amplitude different from each other.

In traditional steering wheels, if the support structure 2 rotates by an angle $\alpha$ around the steering column, the torsion angle of the arms used for the steering control has amplitude of the same angle $\alpha$. As the arms reach the limit of their torsion capacity, they get asynchronously detached from the steering wheel to take the initial position again and complete the steering control action.

Advantageously, according to the technology disclosed herein, upon the steering device 1 being rotated by an angle a around the steering column, the torsion angle of the arms used for the steering control is near zero. The twist grips 7 can be rotated in an opposite direction with respect to the rotation of the support structure 2, thus balancing the torsion of the arms around the column, i.e. since the rotation of the support structure and the torsion of the arms are equal and opposite, the resultant force is zero.

Since the resultant of the rotations given to the structure 2 and to the handgrips 7 represents the work done by the arms and the shoulders for the control of the steering device 1, it is clear that the stresses applied to arms and shoulders shall be minimum or near to zero.

The steering control is mainly applied by means of the forearms, carrying out a work of negligible entity. Consequently, the steering is more convenient and also quicker both in everyday driving and in the particular case of driving under non conventional conditions, such as rallies, road races, track races or the like, where the steering readiness is a critical factor and the advantage of the use of the steering device according to the technology disclosed herein is even more evident.

As an alternative to the two mobile handgrips 7a, 7b, one can be non rotatably fixed to the support structure 2 while the handgrip symmetrical with respect to the median axis A-A, can be left freely rotatable.

Furthermore, the technology disclosed herein allows the extraction of the twist grips 7 from the support structure 2, when the vehicle is stopped, to prevent an unauthorised use of the vehicle.

The support structure 2 may comprise more than one spoke. As an alternative, it can also be designed without the spokes 3, for example shaped as a disk extending from the central hole 4 for the fastening to the steering column.

In particular, the spokes 3 can be of the type shown in FIG. 9; in this case the angle between them is adjustable, because the spokes fit the hub or the steering column, by means of seats 120, in a position determined beforehand and not variable during the driving. The angle or the number of spokes complies with the particular safety and comfort requirements for the driver.

In view of the above, it is clear that for every vehicle that uses the steering device according to the technology disclosed herein there are better driving conditions. The safety is considerably increased; it is no longer necessary to detach the hands from the steering wheel during the steering, even during bends with short radius as those occurring, for example, in U-turns. Arms and shoulders are no longer heavily stressed; the driving is more relaxed and the steering quicker; the possibility of removing the handgrips guarantees a reasonable safety against theft.

In the group of FIGS. 3a, 3b, 4a and 4b a second embodiment of the technology disclosed herein is shown in two different operating positions in which, in order to identify parts equal or similar to those in the group of FIGS. 1a-1d, the same reference numbers already used will be used again, and to indicate modified parts, reference numbers increased by 100 will be used. In some embodiments, such as those of FIG. 3a, FIG. 3b, FIG. 4a, FIG. 4b, FIG. 5a and FIG. 5b, each spoke has a shape enlarged at its distal end, e.g., an enlarged region at the spoke end which is distal to the central opening. Each distal enlarged region is provided with slots so that the two rotatable handgrips may be arranged at differing angular positions, e.g., at a first angular point or a second angular point, for example.

In this embodiment, handgrips consist of two crown segments of a normal steering wheel, possibly having imprints for the abutment of the fingers. The steering device 20 can thus be grasped in a more comfortable way in comparison with the basic embodiment.

In the group of FIGS. 5a-5d and 6a-6d a third embodiment of the technology disclosed herein is shown in two different operating positions, in which in order to, to identify parts equal or similar to those in the group of FIGS. 1a-1d, the same reference numbers already used will be used, and to indicate modified parts, reference numbers increased by 200 will be used.

In this embodiment, handgrips are made of two reversed "cow horns" 207 possibly having imprints for the abutment of the fingers. As shown in and understood by FIGS. 5a-5d and 6a-6d, each of the hand grips 207 comprise." a first handgrip end segment 207-1, a second handgrip end segment 207-2 which is a free end, and a third handgrip segment 207-3. The first handgrip end segment 207-1 and the second handgrip end segment 207-2 lie in respective end segment planes which are spaced apart and parallel to the lying and rotating plane of said support structure. The third handgrip segment 207-3 is connected between the first handgrip end segment 207-1 and the second handgrip end segment 207-2, with the third handgrip segment 207-3 extending in a direction parallel to the pivot axis. The second handgrip end segment 207-2 has an essentially cantilever cylindrical shape and is configured to be gripped by a hand of a driver.

In particular, in the FIGS. 5a, 5b, the pivot 6a, 6b is preferably fixed in an adjustable position within a slot 210 of it's corresponding spoke 3a, 3b. In FIGS. 5a, 5b the slot 210 is shown as an elongated slot formed in the two spokes 3a, 3b. Each pivot is adjustably positionable within the slot 210 of its respective spoke 6a, 6b in a direction of elongation which is orthogonal to the pivot attachment axis. In view of the slot 210, an angle between the pivot axis and a center of the center hole 4 is adjustable. As an alternative, the slot can be formed on the handgrip 207. The slots permit the placing of the handgrips following the shape of one of the two slots and considering the particular needs of the driver.

The said slots can be present also in the other embodiments of the technology disclosed herein.

In the group of FIGS. 7a-7d a fourth embodiment of the technology disclosed herein is shown, in which to identify parts equal or similar to those in the group of FIGS. 1a-1d, the same reference numbers already used will be used, and to indicate modified parts, reference numbers increased by 300 will be used.

In FIGS. 7a-7d a steering device 40 is shown, in different views, in a central position with handgrips 307 of the reversed "cow horns" type; in this embodiment, the steering device 40 has two crown segments, the first one 11 upwardly and the second one 12 downwardly.

The two segments are fixed to the hub by means of respective spokes 13 and 14 and rotate therewith owing to a steering control applied to the steering device 40. In this embodiment, the driver can take advantage of the shape of a traditional steering wheel for abutting his hands during long rectilinear ways.

As it can be easily understood from the figures, the rotation of the handgrips is neither hindered nor conditioned by the two crown segments 11 and 12; thus, their presence has an aesthetic effect helpful to make the new steering wheel looking more conventional and less unconventional.

Obviously, in the solutions of FIGS. 7a-7d, the handgrips can be made with the shapes of the previous embodiments, in particular that of FIG. 5, thus maintaining the shape of the traditional steering wheel.

In the group of FIGS. 8a-8d a fifth embodiment of the technology disclosed herein is shown, in which to identify part equal or similar to those in the group of FIGS. 7a-7d, the same reference numbers already used will be used and to indicate modified parts, reference numbers increased by 100 will be used.

In FIGS. 8a-8d a steering device 50 is shown, in different views, in a central position with handgrips 307 of the reversed "cow horns" type; in this embodiment, the steering device 50 is provided with a lower segment of crown 112.

The segment is fixed to the hub by means of a spoke 114 and rotates therewith upon a steering control is applied to the steering device 50.

A very important feature of the technology disclosed herein is that, as shown in FIGS. 8a-8d, it is possible to omit, at least partially or also totally, the crown of the traditional steering wheel, thus preventing to place the airbag for the driver not necessary on the steering wheel, but also on the dashboard in front of the driving position, namely using the same arrangement that, for example, is provided for the passenger.

Such a positioning of the airbag leads to the insertion, also after the purchase of a vehicle, of the steering device that is easy adaptable, by merely modifying or changing the hub assembled in the current production.

Furthermore, the visibility of the instrument system can be notably improved, to the advantage of the driving safety and comfort.

Finally, it also becomes easier to place on the steering wheel those commands that now are placed along the crown of the steering wheel (For example the gearbox control, the audio device control, etc.).

Obviously, the configuration of the steering device can be flat or of cup-shaped type, or of any other known type.

The invention claimed is:
1. A steering device comprising:
a support structure comprising a central hole for fixing said support structure onto a steering column, wherein said support structure is rotatable together with the steering column to operate steering mechanisms; wherein the support structure comprises two spokes extending in a lying and rotating plane of the support structure;

two rotatable handgrips respectively connected to the two spokes comprising said support structure, wherein the two handgrips are placed at distal positions with respect to the central hole, each of the two rotatable handgrips comprising:

a pivot, rotatably attached to the support structure and freely rotatable, in a range from 0° to 360° without regard to rotation of the steering column, around a pivot attachment axis substantially orthogonal to the lying and rotating plane of said support structure, a first handgrip end segment, a second handgrip end segment which is a free end, and a third handgrip segment, the first handgrip end segment and the second handgrip end segment lying in respective end segment planes which are spaced apart and parallel to the lying and rotating plane of said support structure, the third handgrip segment being connected between the first handgrip end segment and the second handgrip end segment, the third handgrip end segment extending in a direction parallel to the pivot attachment axis, the second handgrip end segment having an essentially cantilever cylindrical shape and being configured to be gripped by a hand of a driver and to thereby manually impart a rotation motion around an axis of the steering column to the support structure, wherein an elongated slot is formed in each of the two spokes;

wherein the pivot is adjustably positionable within the slot of the respective spoke in a direction of slot elongation which is orthogonal to the pivot attachment axis whereby an angle between the pivot axis and a center of the center hole is adjustable;

wherein a free space is provided between a free end of the second handgrip end segment and said lying and rotating plane of said support structure.

2. The steering device according to claim 1, wherein each of said two spokes has a reduced width toward an end of the spoke.

3. The steering device according to claim 1, wherein each of said spokes comprises an axis and wherein the axis of the two spokes intersect at the center of said central hole and form an angle between the spokes.

4. The steering device according to claim 1, wherein each of said two spokes has an enlarged end, wherein each enlarged end comprises the elongated slot, wherein the elongation of the slots is such that said rotatable pivots are fixed in an adjustable position within said slots so that the pivot attachment axis of said two rotatable pivots form, with an axis of the steering column, at least a first angle and a second angle when said two rotatable pivots are arranged at a first angular position and at a second angular position, respectively.

5. The steering device, according to claim 1, wherein said two rotatable handgrips are removably connected to said support structure.

6. The steering device according to claim 1, wherein said support structure further comprises plural peripheral through holes arranged around said central hole in such a way that said plural peripheral through holes are not in contact with a circumference of said central hole, and wherein said peripheral through holes are six peripheral through holes which are equally angularly arranged around said central hole.

7. The steering device according to claim 1, wherein said support structure is a planar support structure laying on said laying and rotating plane.

8. The steering device according to claim 1, wherein each of said spokes comprises an axis and wherein the axis of the two spokes intersect at a center of said central hole and form an angle which is different from 180°.

9. The steering device according to claim 1, wherein said pivot has a diameter which is less than a diameter of said central hole.

10. A steering device comprising:

a support structure comprising a central hole for fixing said support structure onto a steering column, wherein said support structure is rotatable together with the steering column to operate steering mechanisms; wherein the support structure comprises two spokes extending in a lying and rotating plane of the support structure;

two rotatable handgrips respectively connected to the two spokes comprising said support structure and placed at distal positions with respect to the central hole, each of the two rotatable handgrips comprising:

a pivot, rotatably attached to the support structure and freely rotatable, in a range from 0° to 360° without regard to rotation of the steering column, around a pivot attachment axis substantially orthogonal to the lying and rotating plane of said support structure, a first handgrip end segment, a second handgrip end segment which is a free end, and a third handgrip segment, the first handgrip end segment and the second handgrip end segment lying in respective end segment planes which are spaced apart and parallel to the lying and rotating plane of said support structure, the third handgrip segment being connected between the first handgrip end segment and the second handgrip end segment, the third handgrip end segment extending in a direction parallel to the pivot attachment axis, the second handgrip end segment having an essentially cantilever cylindrical shape and being configured to be gripped by a hand of a driver and to thereby manually impart a rotation motion around an axis of the steering column to the support structure, wherein an elongated slot is formed in at least one of the two spokes;

wherein a free space is provided between a free end of the second handgrip end segment and said lying and rotating plane of said support structure;

wherein the pivot is adjustably positionable within the slot of the respective spoke in a direction of slot elongation along the pivot attachment axis.

11. The steering device according to claim 10, wherein each of said two spokes has a reduced width toward an end of the spoke.

12. The steering device according to claim 10, wherein each of said spokes comprises an axis and wherein the axis of the two spokes intersect at the center of said central hole and form an angle between the spokes.

13. The steering device according to claim 10, wherein said two rotatable handgrips are removably connected to said support structure.

14. The steering device according to claim 10, wherein said support structure further comprises plural peripheral through holes arranged around said central hole in such a way that said plural peripheral through holes are not in contact with a circumference of said central hole, and wherein said peripheral through holes are six peripheral through holes which are equally angularly arranged around said central hole.

15. The steering device according to claim 10, wherein said support structure is a planar support structure laying on said laying and rotating plane.

16. The steering device according to claim 10, wherein each of said spokes comprises an axis and wherein the axis of the two spokes intersect at a center of said central hole and form an angle which is different from 180°.

17. The steering device according to claim 10, wherein said pivot has a diameter which is less than a diameter of said central hole.

* * * * *